(12) United States Patent
Ambroise

(10) Patent No.: US 8,042,692 B2
(45) Date of Patent: Oct. 25, 2011

(54) MAILPIECE CONVEYOR DEVICE WITH SERVOCONTROL ON REJECT RATE

(75) Inventor: Stephane Ambroise, Tain l'Hermitage (FR)

(73) Assignee: Solystic, Gentilly Cedex (FR)

(*) Notice: Subject to any disclaimer, the term of this patent is extended or adjusted under 35 U.S.C. 154(b) by 388 days.

(21) Appl. No.: 12/298,797

(22) PCT Filed: Jul. 17, 2008

(86) PCT No.: PCT/FR2008/051344
§ 371 (c)(1),
(2), (4) Date: Oct. 28, 2008

(87) PCT Pub. No.: WO2009/024693
PCT Pub. Date: Feb. 26, 2009

(65) Prior Publication Data
US 2010/0170831 A1 Jul. 8, 2010

(30) Foreign Application Priority Data
Aug. 2, 2007 (FR) ..................... 07 56895

(51) Int. Cl.
*B07C 5/00* (2006.01)
(52) U.S. Cl. ........ 209/555; 209/584; 209/586; 209/900; 700/223
(58) Field of Classification Search ............... 209/555, 209/584, 586, 900; 700/223–226
See application file for complete search history.

(56) References Cited

U.S. PATENT DOCUMENTS

| | | | |
|---|---|---|---|
| 3,724,657 A * | 4/1973 | Katagiri et al. ........... 271/301 |
| 3,889,811 A * | 6/1975 | Yoshimura ............... 209/549 |
| 5,267,638 A | 12/1993 | Doane |
| 5,363,971 A * | 11/1994 | Weeks et al. ............ 209/584 |
| 5,725,720 A * | 3/1998 | Micaletti et al. ........ 156/364 |
| 5,813,327 A * | 9/1998 | Freeman et al. ........... 101/93 |
| 6,023,034 A * | 2/2000 | Nakajima et al. ......... 209/584 |
| 6,481,712 B1 * | 11/2002 | Yap ........................... 271/303 |
| 6,888,356 B2 * | 5/2005 | Jean-Raoul ............... 324/452 |
| 6,897,394 B1 * | 5/2005 | Dibiaso et al. ........... 209/584 |
| 7,414,219 B2 * | 8/2008 | Quine et al. .............. 209/584 |
| 7,687,737 B2 * | 3/2010 | Zimmermann et al. ... 209/583 |
| 7,778,728 B2 * | 8/2010 | Stemmle .................. 700/228 |
| 7,814,031 B2 * | 10/2010 | Nicolas et al. ........... 705/400 |
| 7,858,894 B2 * | 12/2010 | Stemmle .................. 209/584 |
| 2001/0035332 A1 | 11/2001 | Zeitler |
| 2002/0179503 A1 * | 12/2002 | Yap ........................... 209/657 |
| 2002/0188377 A1 | 12/2002 | Neary et al. |
| 2004/0075405 A1 | 4/2004 | Brixius et al. |
| 2004/0104100 A1 | 6/2004 | Schiesser et al. |

FOREIGN PATENT DOCUMENTS

| | | |
|---|---|---|
| EP | 0 818 406 A1 | 1/1998 |
| EP | 1 683 586 A1 | 7/2006 |

* cited by examiner

*Primary Examiner* — Joseph C Rodriguez
(74) *Attorney, Agent, or Firm* — Rothwell, Figg, Ernst & Manbeck, P.C.

(57) ABSTRACT

A device for conveying flat articles, in which device the flat articles are moved in series while being at a pitch one from the next that is normally constant, includes a synchronization device for compensating for a certain amount of variation in said pitch. This device includes:
  means for categorizing the articles on the basis of certain physical characteristics of the articles;
  means for identifying a certain amount of variation in the pitch for the current article and for recording said pitch variation in a memory in correspondence with the class of the current article; and
  means for servocontrolling the synchronization system on the basis of said pitch variations recorded in the memory in correspondence with said classes of articles.

6 Claims, 2 Drawing Sheets

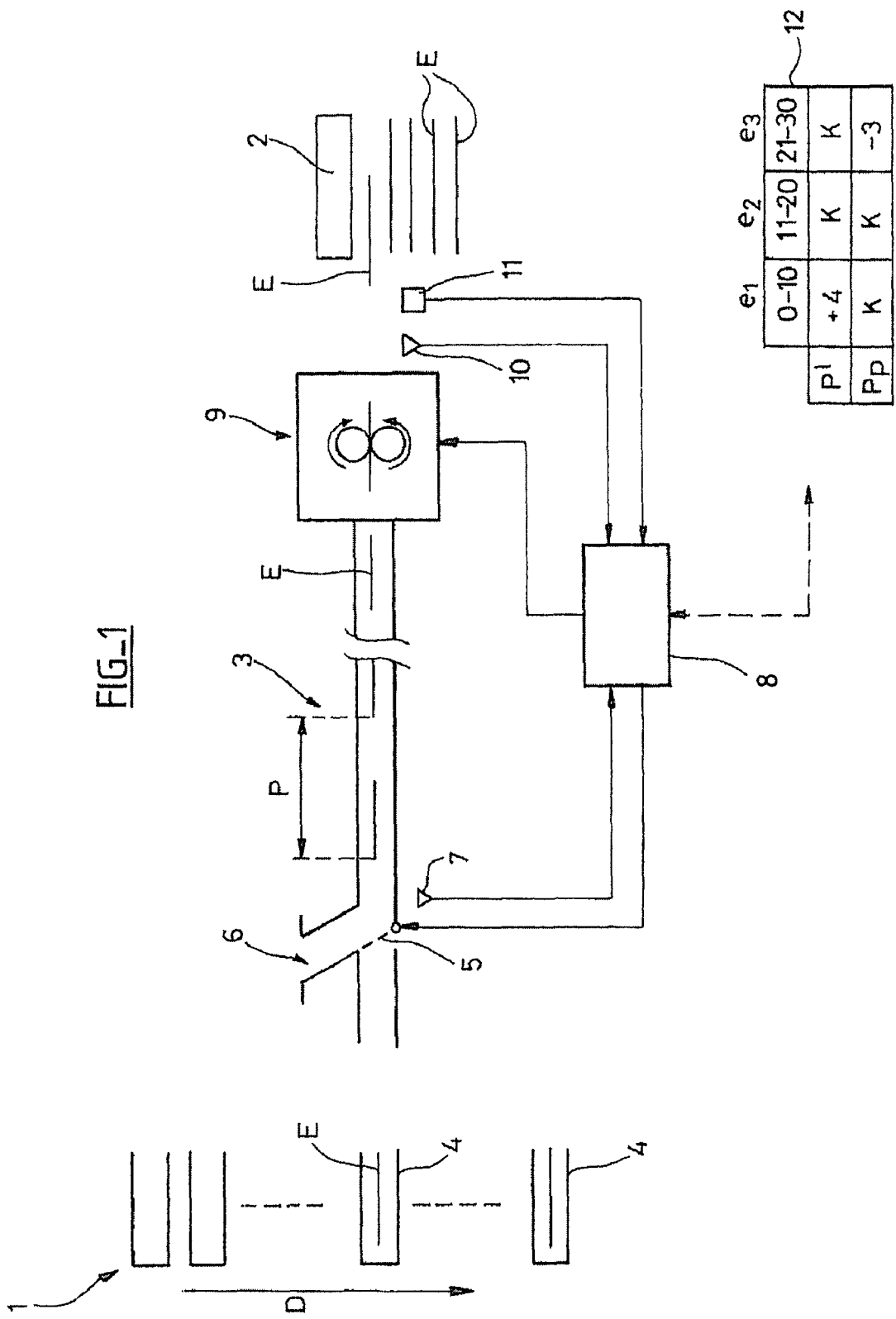
FIG_1

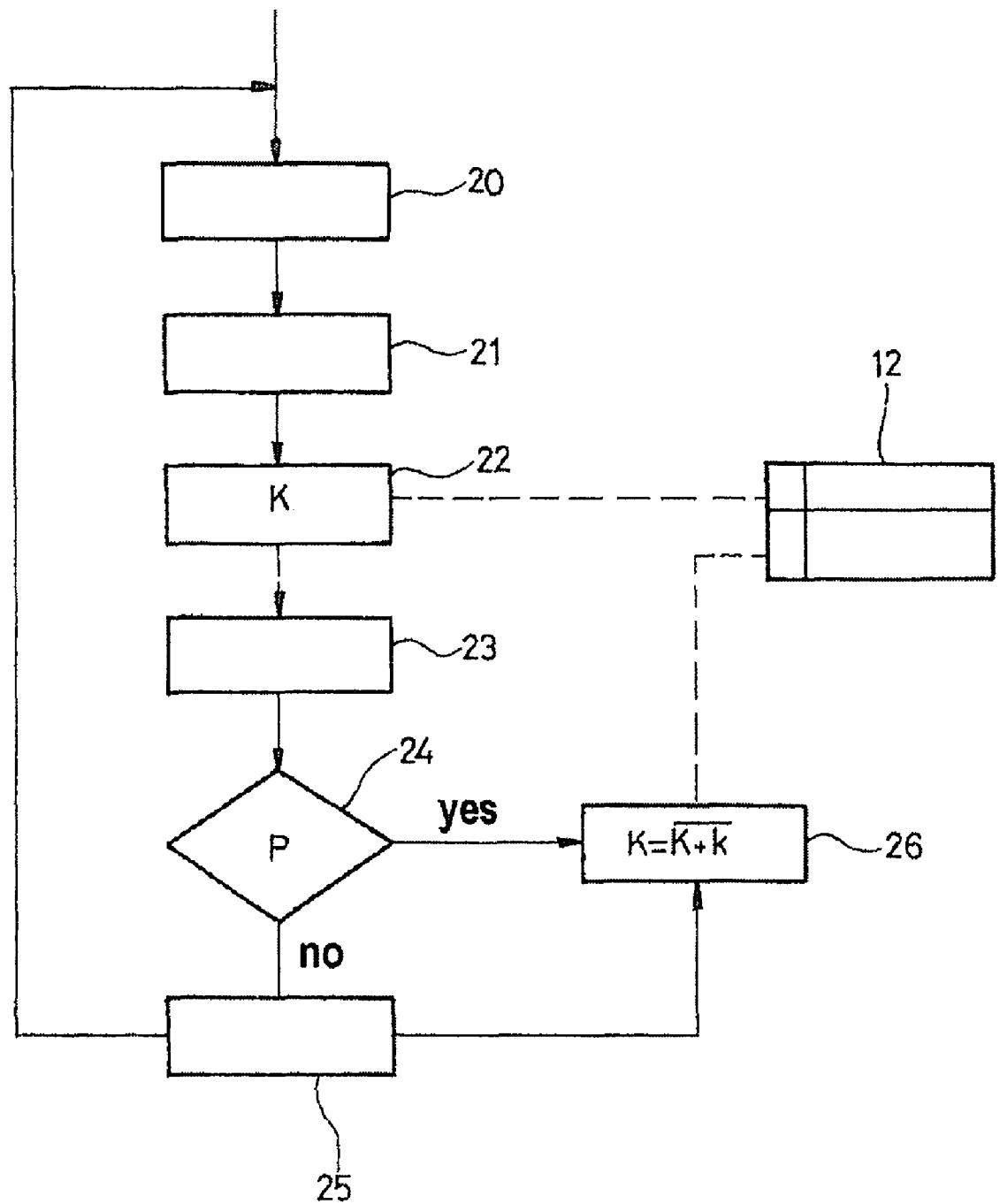

MAILPIECE CONVEYOR DEVICE WITH SERVOCONTROL ON REJECT RATE

CROSS-REFERENCE TO RELATED APPLICATIONS

This application is a 35 U.S.C. §371 National Phase Application from PCT/FR2008/051344, filed Jul. 17, 2008, and designating the United States, which claims the benefit of France Patent Application No. 0756895, filed Aug. 2, 2007.

BACKGROUND OF THE INVENTION

1. Field of the Invention

The invention relates to a conveyor device for conveying flat articles, in which device the flat articles are moved in series while being at a pitch one from the next that is normally constant, and in which device a synchronization system is provided for compensating for variation in said pitch.

The invention relates more particularly to such a conveyor device that is interposed between a mailpiece unstacker and a bin carrousel directing the mailpieces to sorting outlets.

2. Discussion of the Background Art

European Patent No. 1 214 263 discloses such a belt conveyor device equipped with a synchronization device having elastically deformable wheels driven in rotation at variable speed. That conveyor is designed to move mailpieces ranging from an ordinary letter of thickness less than 1 millimeter (mm) to a mailpiece or "flat" of large format and of thickness as large as 32 mm.

The bins of the carrousel move above the sorting outlets at a constant speed. Each bin is loaded with a mailpiece coming from the conveyor.

The unstacker is controlled by a periodic reference signal having its frequency aligned on the frequency with which the bins go past the free end of the conveyor.

When a mailpiece is unstacked in response to an edge of the reference signal being detected, it passes firstly through the synchronization device in which it undergoes an acceleration/deceleration stage so as to be brought to the speed of the belts of the conveyor. It is then taken in charge by the belts of the conveyor so as to be brought at constant speed to the bin carrousel. The instant at which the mailpiece is input into the synchronization device is detected on the basis of a passage sensor that makes it possible to adjust an acceleration profile for the mailpiece within the synchronization device in such a manner as to make the arrival of the mailpiece at the end of the conveyor coincide with the instant at which an empty bin serving to receive the mailpiece goes past.

At the end of the conveyor, the instant at which the mailpiece arrives is monitored so as to check that it is neither too early nor too late relative to the expected coincide time, and if it is, the mailpiece is directed to a reject outlet before being reinserted into the inlet of the unstacker. In practice, in that known device, the period with which the bins go past the conveyor is 333 milliseconds (ms). The time window for presenting a mailpiece to an empty bin, on either side of the coincide time extends from −15 ms late to +20 ms early. Outside that time window, the mailpiece is not injected into a bin, but rather it is deflected to the reject outlet.

It has been observed that, with a highly mixed batch of mailpieces, i.e. a batch covering a broad spectrum of mailpieces ranging from letters to large-format flat articles or "flats", it is possible to have a high percentage of mailpieces rejected, which can affect the throughput of the machine.

Documents EP 1 683 586 and EP 0 818 406 disclose synchronizer devices in which mailpiece speed is adapted as a function of detecting mailpiece thickness or weight, so as to obtain inter-mailpiece pitch that is constant.

SUMMARY OF THE INVENTION

An object of the invention is to propose an improved conveyor device.

The invention is based on the observation that the transport time for which the mailpieces are conveyed on the belt conveyor (which normally operates at constant speed) also depends on certain physical characteristics of the mailpieces. A mailpiece of small thickness, for example (such as a letter), goes faster than a mailpiece of larger thickness (such as a flat), a mailpiece in a plastic envelope goes faster than a mailpiece in a paper envelope. The difference in travel time between the slowest mailpieces and the fastest mailpieces can be of the order of a few milliseconds. This means that the pitch between consecutive mailpieces (having different physical characteristics) can vary widely while the mailpieces are moving on the belts of the conveyor, in particular when the conveyor extends over a long length. The basic idea of the invention is thus to compensate for the variations in inter-mailpiece pitch by servo-controlling the synchronization device as a function of the time late or the time early as measured for various categories of rejected mailpieces, each category of mailpiece corresponding to certain physical characteristics of the mailpieces.

To this end, the invention provides a device for conveying flat articles having outer envelopes made of a plastics material or of paper, in which device the flat articles are moved in series while being at a pitch one from the next that is normally constant, and in which device a synchronization device is provided for compensating for a certain amount of variation in said pitch, said device being characterized in that it includes:

detector and categorizer means for detecting whether the outer envelope of a current article is made of a plastics material or of paper, and for categorizing the current mailpiece into one of two classes corresponding respectively to the class of mailpieces having envelopes made of plastic, and to the class of mailpieces having envelopes made of paper;

identifier and recorder means for identifying a certain amount of variation in the pitch for the current article and for recording a cumulative pitch variation in a memory in correspondence with said class of the current article; and servocontrol means for servocontrolling the synchronization system on the basis of said cumulative pitch variation recorded in the memory in correspondence with said class of the current article.

In a particular embodiment of the invention, the conveyor device includes means for measuring the thickness of the current article, and the categorizer means are arranged so as to categorize the current mailpiece into one of three classes of thickness.

In practice, for mailpieces, these physical characteristics are constituted by the thickness of each mailpiece and/or by the type (plastic or paper) of the outer envelopes of the mailpieces. But it is possible to extend the principle of the invention to other physical characteristics of the mailpieces that can influence the speed of movement of the mailpieces in a belt conveyor, such as mailpiece height, length, and weight.

BRIEF DESCRIPTION OF THE DRAWINGS

The invention can be better understood on reading the following description of an embodiment shown in the drawings, in which:

FIG. 1 shows a conveyor device of the invention;

FIG. 2 is a flow chart showing how the servocontrol of the invention operates.

DETAILED DESCRIPTION OF THE PREFERRED EMBODIMENTS

FIG. 1 is a highly diagrammatic fragmentary view of a mail sorting machine including a bin carrousel 1 fed via an inlet line including an unstacker 2 that serializes the mailpieces E stored in a stack in the unstacking magazine.

At the outlet of the unstacker, the mailpieces E are moved in series and on edge by a belt conveyor 3 so as to be injected one-by-one into the successive bins 4 of the carrousel 1 and so as to be directed towards sorting outlets (not shown) of the machine.

For reasons of clarity, FIG. 1 does not show the installation for automatically reading postal addresses that serves, for each unstacked mailpiece, to determine which sorting outlet corresponds to the address as recognized automatically on the mailpiece.

The bins 4 move at normally constant speed in a direction D perpendicular to the end of the conveyor 3, the difference between the instant at which a bin goes past the conveyor 3 and the instant at which the next bin goes past said conveyor is, for example, 333 ms.

The mailpieces E must thus be presented one by one to an empty bin 4 of the carrousel 1 at a time that coincides with the bin 4 in question going past. However, a certain time window is available around that coincide time, early or late, e.g. from −15 ms late to +20 ms early. If the mailpiece is not presented within this time window, it is directed by means of a controlled deflector 5 to a reject outlet referenced 6. The instant at which an article is presented at the end of the conveyor 3 is detected by means of a passage sensor 7 situated immediately upstream from the deflector 5. The signal generated by the sensor 7 is sent to a control unit 8 that actuates the deflector 5, where necessary.

The unstacker 1 is controlled on the basis of a control signal that is synchronous with the frequency at which the bins 4 go past the conveyor 3, so that the mailpieces E follow one another in series in the conveyor 3 at a pitch P that is normally constant for consecutive mailpieces. This pitch P is the distance between the leading edges of two consecutive mailpieces, as shown in FIG. 1.

A synchronization device 9 (e.g. having elastically deformable motor-driven wheels) is provided at the inlet of the conveyor 3 so as to adjust the speed of each mailpiece unstacked from the unstacker 1 to the constant speed of the conveyor. At the same time, the synchronization device 9 sets the pitch of consecutive mailpieces in such a manner as to compensate for any variation in the mailpiece unstacking time. The synchronization device is controlled by the unit 8, which unit acts on the speed of rotation of the deformable wheels of the device 9.

A passage sensor 10 is disposed between the synchronization device 9 and the unstacker 2 for the purpose of detecting the passage of the leading edge of the unstacked current mailpiece, and, on the basis of the resulting detection signal, the control unit 8 computes the speed profile (acceleration/deceleration profile) that needs to be followed by the current mailpiece through the synchronization device in order for the instant of arrival of the current mailpiece to coincide with the instant of arrival of a bin of the carrousel (the length of the conveyor 3 and the conveying speed being parameters that are fixed).

In accordance with the invention, certain physical characteristics of the mailpieces E unstacked by the unstacker 2 are determined before said mailpieces pass through the synchronization device 9, e.g. the type of envelope of the mailpiece (paper/plastic) and the thickness of the mailpiece. Specific sensors exist for identifying these two physical characteristics. The block 11 represents sensors suitable for measuring the thickness e of each mailpiece and for determining the type (paper/plastic) of the envelope of each mailpiece.

The signals generated by the sensors 11 are delivered to the control unit 8 so as to categorize each mailpiece. In general, said sensors 11 are already available in an unstacker.

By way of example, FIG. 1 shows six categories of mailpieces E in a table 12 that is stored in a memory in the control unit 8. The columns e1, e2, and e3 of the table correspond to three different ranges of mailpiece thickness: 0 mm to 10 mm; 11 mm to 20 mm; and 21 mm to 30 mm. The rows Pl and Pp of said table correspond to two types of mailpiece envelope: namely plastic and paper. As regards thickness, it is possible to provide more than 3 columns in order to increase the number of categories of mailpieces to be distinguished between without going beyond the ambit of the invention. Naturally the table 12 can become more complex if other physical characteristics of the mailpieces are taken into account (weight, height, length). For example, the mailpiece categories can be supplemented by taking account of the physical characteristics constituted by height and length. In which case, a new dimension can be added to the table 12. The physical characteristics constituted by height and length are particularly representative of speed variations for machines in which the mailpieces are conveyed flat. As a result, the dimensions and the characteristics of the table 12 defining the mailpiece categories can be adapted as a function of the type of sorting machine. The physical characteristics constituted by thickness, height, length, and weight can be combined with the type (plastic or paper), and can be used instead of one another without going beyond the scope of the invention.

Operation of the control unit 8 is described below with reference to the flow chart of FIG. 2.

A current mailpiece E is unstacked at 20 by the unstacker 2. The physical characteristics (thickness, type of envelope) of the mailpiece are identified at 21 by the sensors 11 and the mailpiece is categorized in the unit 8 so as to retrieve a servocontrol value K from the table 12 in step 22. It should be understood that, when the processes is initialized, all of the values K of the table 12 are set to zero.

The servocontrol value K retrieved from the table 12 is taken into account (for advancing or retarding the movement of the mailpiece) while computing the speed profile of the mailpiece for controlling the synchronization device at 23. For example, if K is equal to +4 ms, then, for this category of mailpieces, the control unit 8 applies a delay of 4 ms to the time for which the mailpiece moves in the conveyor 3.

The current mailpiece is moved by the conveyor 3 and, as said mailpiece goes past the sensor 7, the unit 8 determines at 24 whether said mailpiece is "outside" the pitch P, i.e. whether it is too early or too late relative to the expected coincide time. If the instant at which the current mailpieces is presented lies within the tolerance time window (the mailpiece is "inside" the pitch P), the control unit 8 actuates the deflector 5 so that the mailpiece is injected into a bin 4 of the carrousel (step 25), and the process continues for another mailpiece starting from step 20.

If, in step 24, the instant at which the current mailpiece is presented lies outside the time window (the mailpiece is "outside" the pitch P), the control unit 8 actuates the deflector 5 in step 25 so as to direct the mailpiece to the reject outlet 6.

At the same time, the unit 8 determines, in step 26, the earliness or the lateness k of the mailpiece relative to the expected coincide time so as to consolidate the servocontrol value K (by computing the mean of K+k) in the table 12 in correspondence with the category of the mailpiece that is determined in step 21, and the process continues from step 20 for another current mailpiece.

For managing the table 12 in the control unit 8, it is possible to make provision for a current value K to be used for the servocontrol by the unit 8 only if a sufficient number of consolidations have already been performed for the corresponding category of mailpiece. It is possible to make provision for the number of consolidations to differ from one category of mailpiece to another. It is also possible to make provision for the servocontrol not to take place by a value of K but, rather, incrementally until the value K is reached.

Two examples of values for K are shown in the table 12 in FIG. 1. The value −3 indicated for the category of mailpieces having paper envelopes and of large thickness (the slowest mailpieces in the conveyor 3) means that mailpieces in this category are given an advance of 3 ms by the synchronization device 9 relative to the coincide time. The value +4 indicated in the table 12 for the category of mailpieces having plastic envelopes and of thickness of less than 10 mm (the fastest mailpieces) means that the control unit 8 computes a speed profile that makes it possible to delay mailpieces of this category by 4 ms relative to the coincide time.

Therefore, with the servocontrol of the synchronization device of the invention, the mailpieces that are rejected are used to lower the reject rate of the next mailpieces. The invention is easy to implement because sensors for sensing physical characteristics of mailpieces are already in wide use in mail sorting machines.

The invention claimed is:

1. A device for conveying flat articles having outer envelopes made of a plastics material or of paper, in which device the flat articles are moved in series while being at a pitch one from the next that is normally constant, and in which device a synchronization device is provided for compensating for a certain amount of variation in said pitch, said device comprising:

detector and categorizer means for detecting whether the outer envelope of a current article is made of a plastics material or of paper, and for categorizing the current mailpiece into one of two classes corresponding respectively to the class of mailpieces having envelopes made of plastic, and to the class of mailpieces having envelopes made of paper;

identifier and recorder means for identifying a certain amount of variation in the pitch for the current article and for recording a cumulative pitch variation in a memory in correspondence with said class of the current article; and servocontrol means for servocontrolling the synchronization system on the basis of said cumulative pitch variation recorded in the memory in correspondence with said class of the current article.

2. A device according to claim 1, including means for measuring the thickness of the current article, and in which the categorizer means are arranged so as to categorize the current mailpiece into one of three classes of thickness.

3. A device according to claim 1, including a sensor for measuring the height of the current article, this measurement serving to categorize the current article.

4. A device according to claim 1, including a sensor for measuring the length of the current article, this measurement serving to categorize the current article.

5. A device according to claim 1, including a sensor for measuring the weight of each current article, this measurement serving to categorize the current article.

6. A mail sorting machine including an unstacker, a bin carousel, and a mailpiece conveyor device according to claim 1 that is interposed between the unstacker and the bin carousel.

* * * * *